(12) United States Patent
Wolf et al.

(10) Patent No.: US 9,518,616 B2
(45) Date of Patent: Dec. 13, 2016

(54) HAND-HELD POWER TOOL WITH A CLUTCH AND METHOD FOR PRODUCING A GROOVE IN THE CIRCUMFERENTIAL WALL OF A CLUTCH DRUM OF A HAND-HELD POWER TOOL

(71) Applicant: Andreas Stihl AG & Co. KG, Waiblingen (DE)

(72) Inventors: Günter Wolf, Oppenweiler (DE); Marcel Förster, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 14/669,218

(22) Filed: Mar. 26, 2015

(65) Prior Publication Data

US 2015/0285315 A1    Oct. 8, 2015

(30) Foreign Application Priority Data

Apr. 5, 2014    (DE) .................. 10 2014 004 930

(51) Int. Cl.
| | |
|---|---|
| *F16D 13/62* | (2006.01) |
| *F16D 43/18* | (2006.01) |
| *B21D 28/00* | (2006.01) |
| *F16D 43/14* | (2006.01) |
| *F16D 67/02* | (2006.01) |
| *B21J 5/00* | (2006.01) |
| *B27B 17/10* | (2006.01) |
| *F16D 13/64* | (2006.01) |

(52) U.S. Cl.
CPC ............... *F16D 13/62* (2013.01); *B21D 28/00* (2013.01); *B21J 5/00* (2013.01); *B27B 17/10* (2013.01); *F16D 43/14* (2013.01); *F16D 43/18* (2013.01); *F16D 67/02* (2013.01); *F16D 13/644* (2013.01)

(58) Field of Classification Search
CPC ......... F16D 43/14; F16D 13/644; B27B 17/10
See application file for complete search history.

(56) References Cited

U.S. PATENT DOCUMENTS

| | | |
|---|---|---|
| 4,662,071 A | 5/1987 | Höppner et al. |
| 5,642,958 A | 7/1997 | Sugiyama |
| 2007/0193850 A1* | 8/2007 | Sturgin ................... F16D 13/64 192/212 |
| 2009/0242351 A1* | 10/2009 | Youngwerth, Jr. ..... F16D 43/18 192/103 A |

(Continued)

*Primary Examiner* — Mark Manley
(74) *Attorney, Agent, or Firm* — Gudrun E. Huckett

(57) ABSTRACT

A hand-held power tool is provided with a drive motor and a clutch connected to the drive motor. The drive motor drives a tool member through the clutch. The clutch has a clutch drum with a circumferential wall provided with an end face. A follower member engages a groove in the circumferential wall of the clutch drum and a driven element is connected to the follower member to be driven by the follower member. The groove extends from the end face of the circumferential wall into the circumferential wall and has a groove bottom and two groove sides positioned opposite each other. The circumferential wall has a protrusion located at the groove bottom. The protrusion has a protrusion thickness measured at the groove bottom that amounts to at least approximately 110% of a wall thickness of the circumferential wall measured at the two groove sides.

15 Claims, 4 Drawing Sheets

(56) References Cited

U.S. PATENT DOCUMENTS

| | | |
|---|---|---|
| 2011/0005888 A1 | 1/2011 | Martinsson et al. |
| 2013/0151126 A1 | 6/2013 | Harrer et al. |
| 2013/0217539 A1* | 8/2013 | Natsume .................. B60K 6/48 477/52 |

\* cited by examiner

HAND-HELD POWER TOOL WITH A CLUTCH AND METHOD FOR PRODUCING A GROOVE IN THE CIRCUMFERENTIAL WALL OF A CLUTCH DRUM OF A HAND-HELD POWER TOOL

BACKGROUND OF THE INVENTION

The invention relates to a hand-held power tool with a clutch and to a method for producing a groove in the circumferential wall of a clutch drum of a hand-held power tool.

U.S. Pat. No. 4,662,071 discloses a hand-held power tool, i.e., a motor chainsaw, comprising a lubricant pump and a clutch with a clutch drum. The lubricant pump is connected to the clutch drum by means of a clutch spring in a detachable way wherein the clutch spring engages between follower teeth at the rim area of the circumferential wall of the clutch drum. It is also known to provide instead of the follower teeth a single groove at the circumferential wall of the clutch drum.

U.S. Pat. No. 5,642,958 discloses an engagement structure of a connecting shell of an automatic transmission. The connecting shell engages grooves of a clutch drum. The connecting shell comprises recesses with locally reinforced edges across the entire length of the edges. In this way, the surface area of the contact sections is to be enlarged in order to transmit the same torque with less surface pressure.

SUMMARY OF THE INVENTION

It is an object of the present invention to provide a hand-held power tool of the aforementioned kind whose clutch drum has a long service life. A further object of the invention resides in providing a method for producing a groove in the circumferential wall of a clutch drum of the hand-held power tool with which a clutch drum can be produced so as to have a long service life.

In accordance with the invention, this is achieved in that the hand-held power tool comprises a drive motor that is driving by means of a clutch a tool member, wherein the clutch comprises a clutch drum with a circumferential wall, wherein the power tool comprises a driven element that is driven by means of a follower member, wherein the follower member projects into a groove in the circumferential wall of the clutch drum, wherein the groove extends from an end face of the circumferential wall into the circumferential wall and comprises a groove bottom and two groove sides or flanks which are positioned opposite each other, wherein the circumferential wall at the groove bottom has a thicker area (protrusion) whose protrusion thickness amounts to at least approximately 110% of the wall thickness of the circumferential wall at the groove sides.

In regard to the method for producing a groove in the circumferential wall of a clutch drum, the object is solved in that in a first step the groove is produced by die cutting with a die-cut groove depth that amounts to approximately 75% up to approximately 95% of the nominal groove depth of the groove and with a die-cut groove width that amounts to approximately 50% up to approximately 110% of the nominal groove width and in that the groove bottom of the groove in a subsequent second step is plastically deformed until the nominal groove depth is reached.

It has been found that a significantly increased service life of a clutch drum can be achieved when the circumferential wall of the clutch drum has a thicker area (protrusion) at the groove bottom and the protrusion thickness thereof amounts to at least approximately 110% of the wall thickness of the circumferential wall measured at the groove sides (groove flanks). The circumferential wall is thus thicker at the groove bottom of the groove compared to the wall thickness at the groove sides or groove flanks. By providing the thicker area (protrusion) at the groove bottom, the generation of a crack in the circumferential wall can be substantially prevented, such cracks being caused under load or stress such that they usually start at the groove bottom. It has been found also that at the groove sides no thicker portions (protrusions) that corresponds to the thicker portion (protrusion) at the groove bottom are necessary. In this way, the area in which the follower member is supported is advantageously not changed so that the clutch drum can be used together with known follower members. A thicker area (protrusion) which is extending substantially at the groove bottom can be produced in a simple way.

Advantageously, the protrusion thickness of the thicker area (protrusion) amounts to less than approximately 200% of the wall thickness of the circumferential wall at the groove sides or flanks, in particular less than approximately 150% of the wall thickness of the circumferential wall at the groove sides or flanks. In this way, a comparatively minimal total thickness of the circumferential wall at the groove bottom can be achieved so that the inner side of the clutch drum and the outer side of the circumferential wall of the clutch drum can be utilized for additional functions, for example, for engaging flyweights (centrifugal weights) or for engaging a brake belt.

Advantageously, the protrusion width of the thicker area (protrusion) measured parallel to the axis of rotation of the clutch amounts to from approximately 0.8 mm up to approximately 2.0 mm. The protrusion width of the thicker area in particular amounts to from approximately 1.2 mm up to approximately 1.8 mm. Since the protrusion thickness of the thicker area (protrusion) is comparatively minimal, the width of the area of the circumferential wall of the clutch drum that is configured for other functions, such as engaging the flyweights or engaging the brake belt, is reduced only minimally. The protrusion length of the thicker area measured in the circumferential direction of the clutch drum advantageously amounts to from approximately 50% up to approximately 200% of the groove width of the groove, in particular from approximately 70% to approximately 150% of the groove width of the groove.

Advantageously, the thicker area extends at least partially on the inner side of the circumferential wall. The inner side of the circumferential wall is advantageously raised at the groove bottom relative to the inner side of the circumferential wall at the groove sides. The rise at the inner side of the circumferential wall advantageously amounts to from approximately 0.05 mm up to approximately 0.3 mm, in particular amounts to from approximately 0.1 mm up to approximately 0.2 mm. Advantageously, the thicker area alternatively or additionally extends on the outer side of the circumferential wall. The outer side of the circumferential wall at the groove bottom of the groove is advantageously raised relative to the outer side of the circumferential wall at the groove sides or flanks. The rise at the outer side of the circumferential wall advantageously amounts to from approximately 0.05 mm up to approximately 0.3 mm, in particular from approximately 0.1 mm up to approximately 0.2 mm. Particularly advantageously, the rise at the outer side of the circumferential wall is very minimal. In order to obtain a sufficiently large contact surface for a brake belt on the outer circumference of the circumferential wall, it is advantageously provided that the outer side of the circumferential wall at the groove bottom is raised by less than 0.1 mm relative to the circumferential wall at the groove sides. In particular, the outer side of the circumferential wall at the groove bottom passes approximately flat into the surrounding area of the circumferential wall. Advantageously, the circumferential wall is not made thicker in the area adjoining the groove sides or flanks.

In order to simplify mounting of the follower member, it is advantageously provided that the groove sides in their areas adjoining the end face of the clutch drum are extending at an angle relative to each other that opens toward the end face. Advantageously, the angle between the groove sides amounts to at least approximately 10°. Preferably, the angle is at least approximately 20°, in particular at least approximately 25°. Advantageously, the angle between the groove sides is smaller than 90°. The groove sides are embodied in particular mirror-symmetrical relative to each other.

The driven element is advantageously a pump, in particular a lubricant pump for conveying lubricant for a tool member, in particular a saw chain of the hand-held power tool that is preferably designed as a motor chainsaw.

Advantageously, the power tool comprises a brake device with a brake belt that interacts with the outer side of the circumferential wall for braking.

Advantageously, the clutch is a centrifugal clutch comprising at least one flyweight (centrifugal weight), wherein the flyweight in the engaged state of the clutch is resting on the inner side of the circumferential wall.

In a method for producing a groove in the circumferential wall of the clutch drum of a hand-held power tool, it is provided that in a first step the groove is produced by die cutting (stamping) with a die-cut groove depth that amounts to approximately 75% up to approximately 95% of the nominal groove depth of the groove and with a die-cut groove width that amounts to approximately 50% up to approximately 110% of the nominal groove width and in that, in a subsequent second step, the groove bottom of the groove is plastically deformed for reaching the nominal groove depth.

Due to the plastic deformation of the groove at the groove bottom, the die-cut edges at the groove are compacted. In this way, a reduced notch factor at the bottom of the groove and an improved homogenous grain structure are obtained. The die-cut groove width produced by die cutting the groove preferably amounts to approximately 80% up to approximately 100% of the nominal groove width of the groove. The die-cut groove width produced by die cutting the groove is advantageously selected such that at the groove sides or flanks substantially no thicker or protruding area is produced. The die-cut groove depth of the die-cut or stamped groove is advantageously at most 2.0 mm smaller than the nominal groove depth of the groove. The groove depth of the die-cut or stamped groove is advantageously smaller by less than 1.0 mm, in particular by less than 0.7 mm, than the nominal groove depth. In this way, in the thicker area (protrusion) minimal bulging and minimal increase in the wall thickness of the circumferential wall are achieved. At the same time, a significant increase of the service life of the clutch drum is achieved. The clutch drum can be produced with a comparatively minimal wall thickness because, as a result of the thicker area (protrusion) at the groove bottom of the groove, a reduced notching effect or stress concentration results and a sufficiently long service life is thus also achieved even with a minimal wall thickness of the circumferential wall.

DESCRIPTION OF THE PREFERRED EMBODIMENTS

Figure 1:
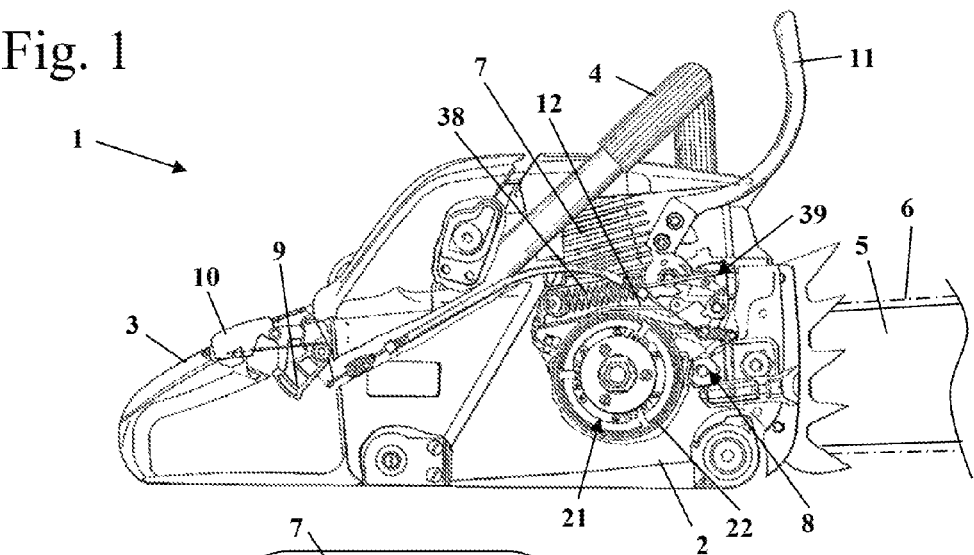
FIG. 1 is a schematic, partially sectioned, side view of a motor chainsaw.

FIG. 1 shows a motor chainsaw 1 as an embodiment of a hand-held power tool. The invention can however also be used in connection with other hand-held power tools, for example, a trimmer, a cut-off machine or the like. The motor chainsaw 1 comprises a housing 2 on which a rear handle 3 and a grip 4 are secured for guiding the motor chainsaw 1 in operation. On the housing 2 of the motor chainsaw 1, a guide bar 5 is arranged on which a saw chain 6 is arranged so as to circulate about it. The saw chain 6 is driven by a drive motor 7 arranged within the housing 2. In the embodiment, the drive motor 7 is an internal combustion engine. For operating the drive motor 7, on the rear handle 3 a throttle trigger 9 and a throttle trigger lock 10 are pivotably supported. The drive motor 7 drives the saw chain 6 by means of a clutch 21 that is embodied in the illustrated embodiment as a centrifugal clutch. The motor chainsaw 1 comprises a brake device 8 with which the saw chain 6 can be braked. For triggering the brake device 8, a hand guard 11 is provided which is pivotably supported on the housing 2 at the side of the grip 4 facing the guide bar 5. The brake device 8 comprises a brake belt 12 which is arranged on the outer circumference of a clutch drum 22 of the clutch 21. The brake device 8 comprises a brake spring 38 which, for braking, is acting on the brake belt 12 and tightens the brake belt 12 about the outer circumference of the clutch drum 22. When starting operation of the motor chainsaw 1, the brake spring 38 must be tensioned. In order to maintain the brake spring 38 in the tensioned state, an elbow lever mechanism 39 is provided on which the hand guard 11 is acting for triggering the brake device 8.

Figure 2:
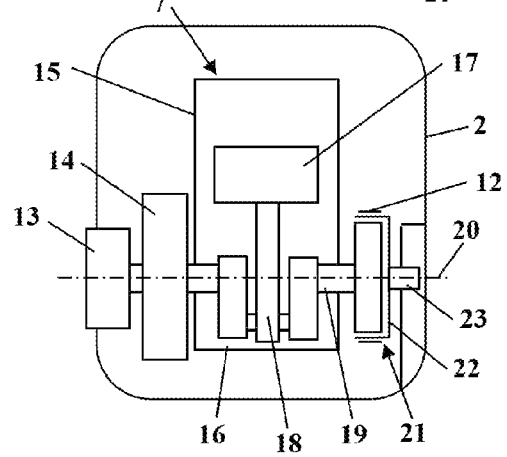
FIG. 2 is a schematic section view of the motor chainsaw of FIG. 1 in the area of the drive motor.

FIG. 2 shows the drive of the saw chain 6 of the motor chainsaw 1 in detail. The drive motor 7 comprises a cylinder 15 in which a piston 17 is supported so as to be reciprocatingly movable. The piston 17 drives by means of a connecting rod 18 a crankshaft 19 that is rotatably supported in the crankcase 16 about an axis of rotation 20. On the crankshaft 19, a fan wheel 14 for conveying cooling air is secured. Instead of the fan wheel 14, a fly wheel without vanes can be provided also. On the side of the fan wheel 14 which is facing away from the drive motor 7, a starter device 13 for the drive motor 7 is provided. The starter device 13 can be, for example, a cable starter to be started manually or an electrically driven starter device. At the side of the drive motor 7 which is facing away from the fan wheel 14, the clutch 21 is arranged. In FIG. 2, the clutch drum 22 as well as the brake belt 12 arranged on the outer circumference of the clutch drum 22 are schematically illustrated. On the clutch drum 22, a drive pinion 23 is secured that serves for driving the saw chain 6.

Figure 3:
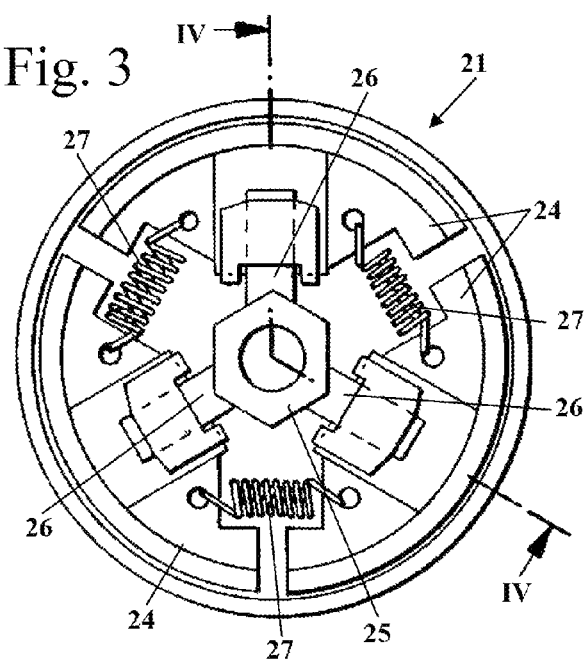
FIG. 3 is a side view of the centrifugal clutch.
Figure 4:
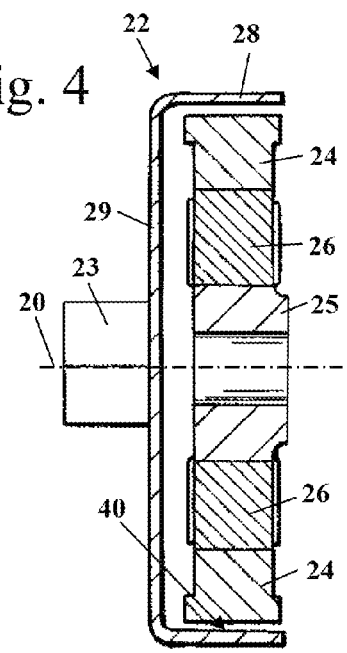
FIG. 4 is a section view along the section line IV-IV of FIG. 3.

FIGS. 3 and 4 show the configuration of the clutch 21 in detail. The clutch 21 comprises a support part 25 on which, in the illustrated embodiment, three flyweights 24 are arranged so as to be movable in radial direction outwardly. The flyweights 24 can also be arranged to be slidable at a slant relative to the radial direction or can be arranged to be pivotable. In the embodiment, arms 26 are provided on the support part 25 and project in radial direction outwardly; the flyweights 24 are guided on the arms 26. Between neighboring flyweights 24 a spring 27 is acting, respectively; in the embodiment, the spring 27 is designed as a tension coil spring and pretensions the flyweights 24 into their radial inward position. With increasing engine speed, the flyweights 24 move against the force of the springs 27 radially in outward direction until they contact the circumferential wall 28 of the clutch drum 22 that is illustrated in FIG. 4. As soon as the flyweights 24 are frictionally connected with the circumferential wall 28, the saw chain 6 is driven by means of the drive pinion 23 that is fixedly connected to the clutch drum 22. The flyweights 24 are then contacting an inner side 40 of the circumferential wall 28. The clutch drum 22 has a sidewall 29 which is formed approximately perpendicular to the axis of rotation 20 and on which the drive pinion 23 is secured in the embodiment.

Figure 5:
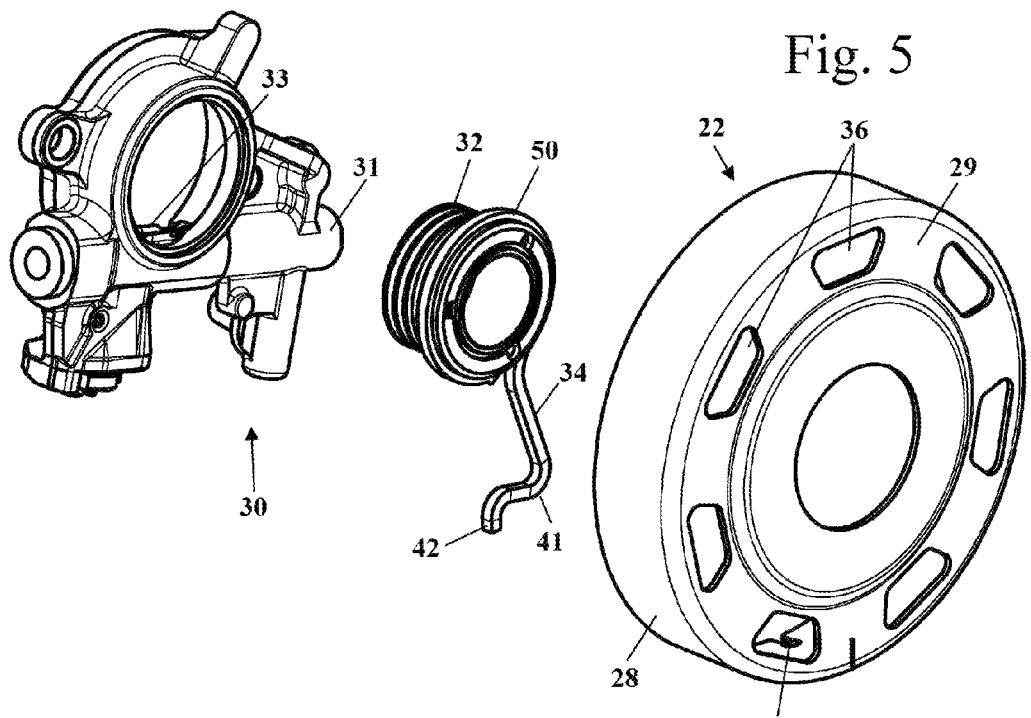
FIG. 5 is a perspective exploded view of the pump and of the clutch drum of the motor chainsaw of FIG. 1.

For conveying a lubricant for the saw chain 6, the motor chainsaw 1 comprises a pump 30 illustrated in FIG. 5. The pump 30 is driven by the drive motor 7. In order to prevent that the pump 30 conveys lubricant as the drive motor 7 idles, the pump 30 is coupled with the clutch drum 22. The clutch drum 22 comprises a groove 35 in the circumferential wall 28 and the groove 35 extends approximately parallel to the axis of rotation 20 (FIG. 2). The pump 30 comprises a follower member 34 which is a wrap spring in the illustrated embodiment. The follower member 34 has a free end 42 which projects into the groove 35 in order to provide the rotary entraining or following action. As soon as the clutch 21 engages and the clutch drum 22 is driven about the axis of rotation 20, the follower member 34 is also entrained.

As shown in FIG. 5, the follower member 34 is arranged on a worm wheel 32 of the pump 30. The follower member 34 comprises a follower section 50 which is designed to have an annular shape and surrounds or wraps around a section of the worm wheel 32. In the unloaded state, the follower member 34 surrounds loosely the worm wheel 32 with its follower section 50 and allows for relative rotation of the worm wheel 32 relative to the follower member 34. When the free end 42 of the follower member 34 in FIG. 5 is entrained to the left by the clutch drum 22, the annular follower section 50 will contract and, in this way, produce a frictional connection to the worm wheel 32. The worm wheel 32 is in engagement with a pump pinion 33 which is arranged in a housing 31 of the pump 30 and which conveys lubricant as is known in the art. The pump 30 thus conveys lubricant only when the clutch drum 22 is rotating. Instead of the pump 30, the motor chainsaw 1 can also comprise another element which is driven by the clutch drum 22 by means of the follower member 34.

Figure 6:
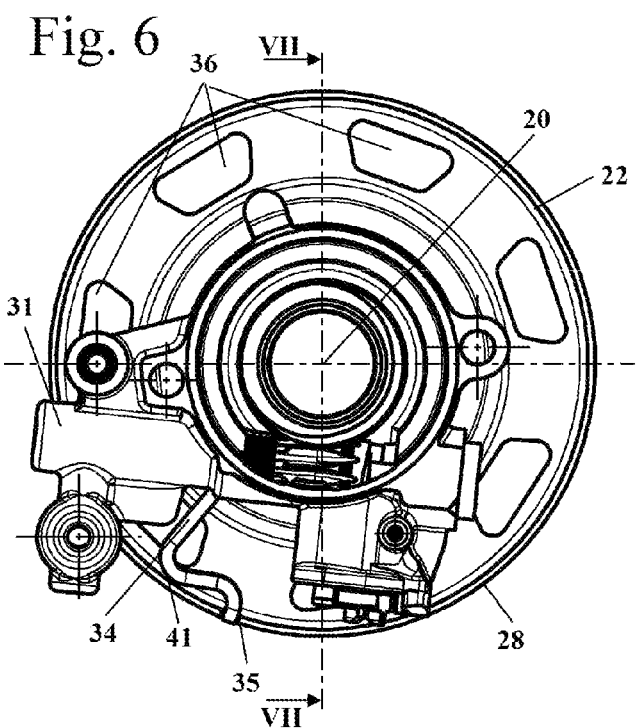
FIG. 6 is a side view of pump and clutch drum.

As is illustrated in FIGS. 5 and 6, the clutch drum 22 has in the sidewall 29 a plurality of openings 36 which serve a weight-saving purpose. As is shown in FIG. 6, the follower member 34 has a support area 41 with which the follower member 34 is supported on the circumferential wall 28 of the clutch drum 22. The location at which the follower member 34 is supported on the circumferential wall 28 is spaced apart from the groove 35 in circumferential direction. Due to the support on the support area 41, the follower member 34 is imparted with a satisfactory stability for transmitting the drive moment onto the pump 30.

Figure 7:
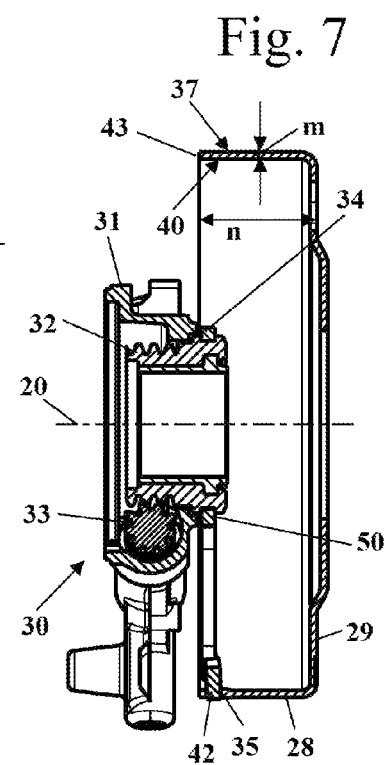
FIG. 7 is a section view along the section line VII-VII of FIG. 6.
Figure 8:
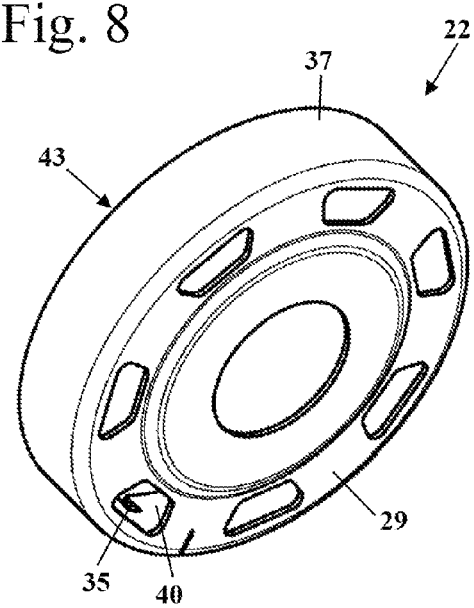
FIG. 8 is a perspective illustration of the clutch drum.

FIG. 7 shows the arrangement of the follower section 50 on the outer circumference of the worm wheel 32 as well as the engagement of the worm wheel 32 with the pump pinion 33. As shown in FIG. 7, the circumferential wall 28 of the clutch drum 22 has a wall thickness m in an area which is remote from the groove 35. On its side which is facing outwardly, the circumferential wall 28 has an outer side 37. The circumferential wall 28 has at the side that is opposite the side wall 29 an end face 43. The clutch drum 22 has a drum width n that is measured parallel to the axis of rotation 20 and is measured from the end face 43 up to the outer side of the side wall 29. The drum width n can be, for example, approximately 10 mm up to approximately 30 mm, preferably approximately 15 mm up to approximately 25 mm. The drum width n is measured in this context in a radial outer area of the clutch drum 22.

Figure 9:
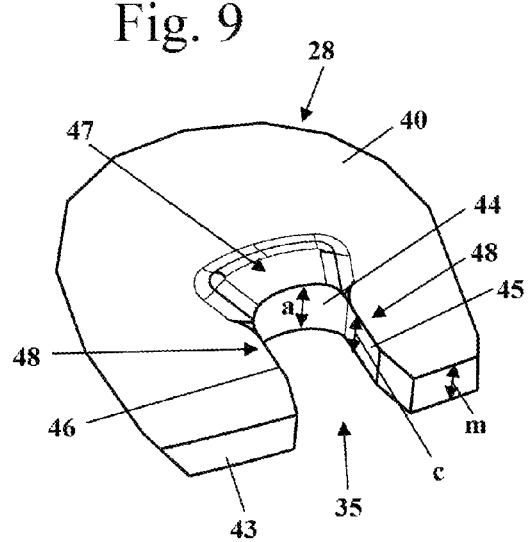
FIG. 9 is a perspective illustration of a detail of the area of the circumferential wall of the clutch drum that is provided with the groove.

FIGS. 8 to 13 show the clutch drum 22 in detail. As shown in FIG. 9, the groove 35 has oppositely positioned groove sides (groove flanks) 45 and 46 which are connected by the groove bottom 44 with each other. In the embodiment, the groove sides 45 and 46 form a U together with the groove bottom 44. Adjacent to the groove bottom 44 a thicker area (protrusion) 47 is arranged on the circumferential wall 28. The thicker area (protrusion) 47 is arranged between the groove 35 and the sidewall 29 and adjoins the groove bottom 44. The protrusion thickness a of the thicker area (protrusion) 47 amounts to at least approximately 110% of the wall thickness c of the circumferential wall at the groove sides 45 and 46. The protrusion thickness a and the wall thickness c (FIG. 9) are measured in radial direction relative to the axis of rotation 20 (FIG. 7). The protrusion thickness a of the thicker area (protrusion) 47 is advantageously less than approximately 200% of the wall thickness c of the circumferential wall 28 at the groove sides 45, 46, in particular less than approximately 150% of the wall thickness c. In the embodiment, the wall thickness c corresponds to the wall thickness m of the circumferential wall 28 in an area which is remote from the groove 35. In the embodiment, the circumferential wall 28 adjoins flat the groove sides 45 and 46; in the wall areas 48 which adjoin the groove sides 46 and 45, the circumferential wall 28 is not thicker (has no protrusion). The wall thickness m of the circumferential wall 28 is advantageously less than approximately 1.25 mm.

Figure 10:
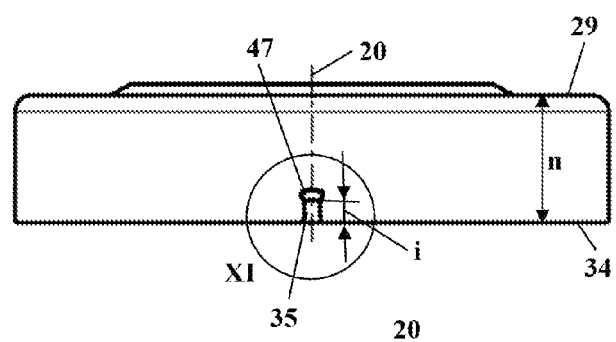
FIG. 10 is a side view of the clutch drum.

As shown in FIG. 10, the groove 35 has a groove depth i measured parallel to the axis of rotation 20. The groove depth i of the groove 35 in this context advantageously amounts to from approximately 12% up to approximately 25%, in particular from approximately 15% to approximately 20%, of the drum width n of the clutch drum 22. The drum width n of the clutch drum 22 in this context is measured from the end face 43 to the outer side of the sidewall 29 in an area of the sidewall 29 which is positioned in radial direction outwardly relative to the axis of rotation 20. The groove depth i of the groove 35 advantageously amounts to from approximately 2.0 mm up to approximately 4.0 mm, in particular from approximately 2.5 mm to approximately 3.5 mm.

Figure 11:
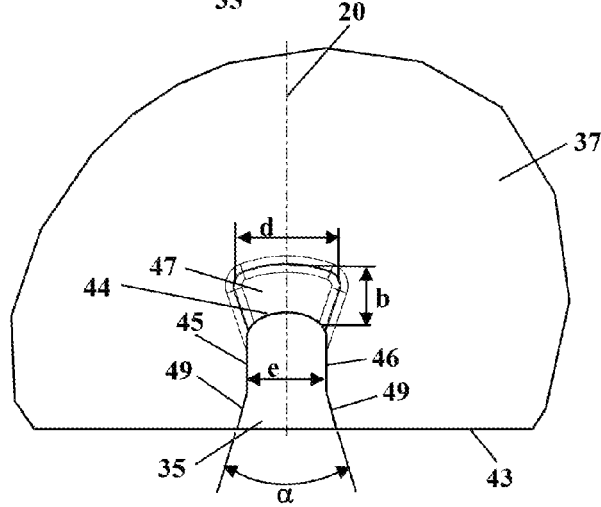
FIG. 11 shows the area XI of FIG. 10 in an enlarged illustration.
Figure 12:
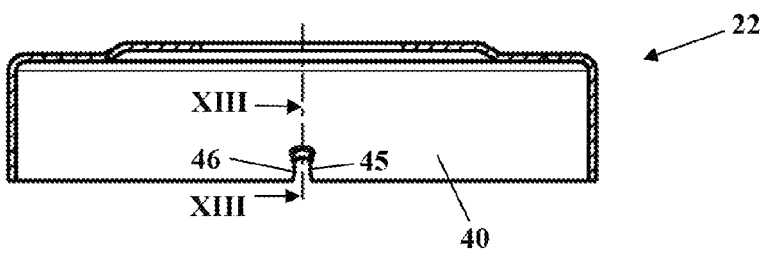
FIG. 12 is a section view of the clutch drum.

FIG. 11 shows the configuration of the groove 35 in detail. In an area 49 which adjoins the end face 43, the groove side 45 opens toward the end face 43. Correspondingly, the area 49 of the groove side 46 adjoining the end face 43 is slanted and extends away from the opposite groove side 45. The two slanted areas 49 of the groove sides 45 and 46 are positioned at an angle α relative to each other which advantageously amounts to at least approximately 10°. The angle α in particular amounts to at least approximately 20°, preferably at least approximately 25°. Advantageously, the angle α is smaller than 90°. The slanted areas 49 extend advantageously across approximately 20% to approximately 60% of the groove depth i of the groove 35 shown in FIG. 10. In the section which is arranged between the slanted areas 49 and the groove bottom 44, the groove sides 45, 46 extend advantageously parallel to each other and parallel to the axis of rotation 20.

The groove 35 has a groove width e which is measured in a plane located between the slanted areas 49 and the groove bottom 44 in a direction perpendicular to the axis of rotation 20. The groove width e is advantageously smaller than the groove depth i. The groove width e can be, for example, from approximately 1.0 mm to approximately 3.0 mm. FIG. 11 shows also the dimensions of the thicker area (protrusion) 47 at the groove bottom 44. The thicker area 47 has a protrusion width b that is measured parallel to the axis of rotation 20 and in the direction of the groove depth i (FIG. 10) which advantageously amounts to from approximately 0.8 mm to approximately 2.0 mm, in particular from approximately 1.2 mm to approximately 1.8 mm. The thicker area 47 has a protrusion length d that is measured in the circumferential direction and advantageously amounts to from approximately 50% to approximately 200% of the groove width e of the groove 35. Advantageously, the protrusion length d amounts to from approximately 70% to approximately 150% of the groove width e of the groove 35. As shown in FIG. 11, the thicker area 47 adjoins the groove bottom 44 and extends in the direction toward the sidewall 29. The thicker area 47 has a protrusion width b that amounts to from approximately 0.8 mm to approximately 2.0 mm and a protrusion length d that amounts to from approximately 50% to approximately 200% of the groove width e of the groove 35, wherein the area of the circumferential wall 28 at the thicker area 47 (FIG. 9) has a protrusion thickness a that is at least 110% of the wall thickness c of the circumferential wall 28 at the groove sides 45, 46 (FIG. 9). Advantageously, the thicker area 47 passes at a slant or curved into the circumferential wall 28 and forms no step relative to the circumferential wall 28.

Figure 13:
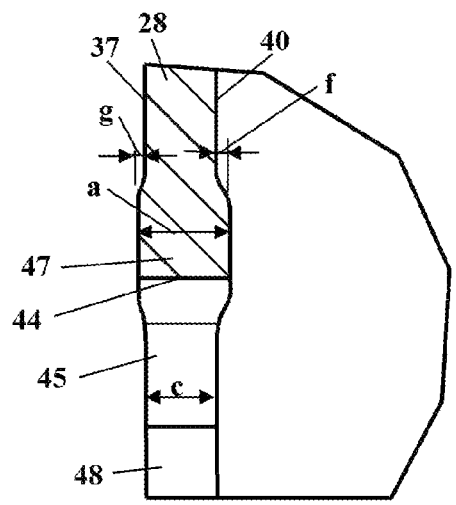
FIG. 13 is a section view along the section line XIII-XIII of FIG. 12 in an enlarged illustration.

As shown in FIG. 13, the circumferential wall 28 in the thicker area (protrusion) 47 is raised at the outer side 37 as well as at the inner side 40. The thicker area 47 has at the outer side 37 a raised portion g that has a rise that advantageously amounts to from approximately 0.05 mm up to approximately 0.3 mm, in particular from approximately 0.1 mm to approximately 0.2 mm. The thicker area 47 has at the inner side 40 a raised portion f that has a rise that advantageously also amounts to from approximately 0.05 mm up to approximately 0.3 mm, in particular from approximately 0.1 mm up to approximately 0.2 mm. Particularly advantageously, the raised portion f is greater than the raised portion g. In particular, on the outer side 37 there is no raised portion g provided so that the circumferential wall 28 at the outer side 37 extends flat up to the groove bottom 44. As also shown in FIG. 13, the circumferential wall 28 is not made thicker at the groove side 45 but has at this location a thickness c that corresponds to the wall thickness m of the circumferential wall 28 in an area which is remote from the groove 35. As shown in FIG. 11, the groove 35 is mirror-symmetrical to a center axis which extends perpendicular to the end face 43.

Figure 14:
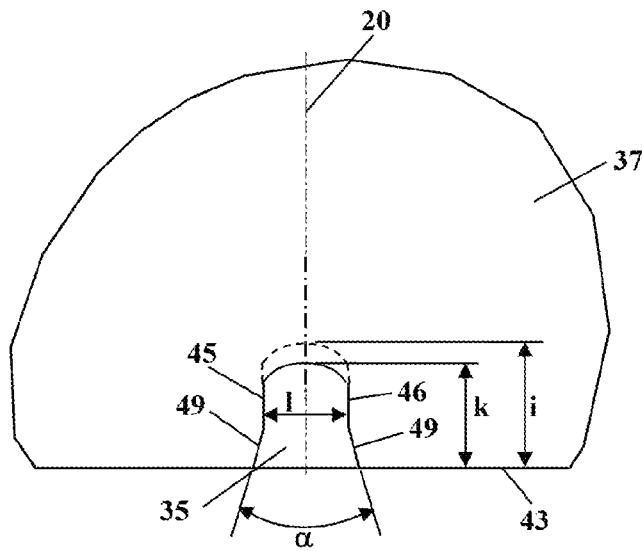
FIG. 14 shows the area of the circumferential wall that is provided with the groove in an enlarged illustration after die cutting and prior to punching the groove.

In order to achieve a comparatively minimal protrusion thickness a of the thicker area 47 and at the same time a satisfactory material reinforcement at the groove bottom 44, it is provided for producing the groove 35 that the groove 35 is first die cut (stamped) into the clutch drum 22. For this purpose, the groove 35 is die cut to have the dimensions indicated in FIG. 14. After die cutting, the groove 35 has the die-cut groove width l, measured in circumferential direction, which amounts to approximately 5% up to approximately 110% of the nominal groove width e of the finished groove 35. The die-cut groove width l corresponds advantageously to approximately 80% up to approximately 100% of the nominal groove width e. The groove 35 is die cut to have a die-cut groove depth k that is smaller than the nominal groove depth i of the finished groove 35. The die-cut groove depth k of the die-cut groove advantageously amounts to approximately 75% up to approximately 95% of the nominal groove depth i. The nominal groove depth i is indicated in FIG. 13 by a dashed line. The groove 35 is advantageously die cut to produce the slanted areas 49 slanted relative to each other at angle α.

In a subsequent method step, the groove bottom 44 of the groove 35 is plastically deformed until the nominal groove depth i is reached. In this context, bulging causes the raised portions f and g (FIG. 13) to be produced and the thicker area (protrusion) 47 to be formed. The tool for plastic deformation, for example, a forming punch, is designed advantageously in this context such that on the groove sides 45 and 46 no or only very minimal plastic deformation will occur so that at the groove sides 45 and 46 no or only a very minimal raised or thicker portion is produced. The groove depth k of the die-cut groove 35 is advantageously smaller than the nominal groove depth i by at most 2.0 mm, in particular less than 1 mm, preferably less than 0.7 mm. Since the plastic deformation and thus also the raised portions f and g are comparatively minimal, engaging of the brake belt 12 (FIG. 1) on the outer side of the clutch drum 22 is not made more difficult and the engagement of the flyweights 24 relative to the circumferential wall 28 is not negatively affected.

The specification incorporates by reference the entire disclosure of German priority document 10 2014 004 930.2 having a filing date of Apr. 5, 2014.

While specific embodiments of the invention have been shown and described in detail to illustrate the inventive principles, it will be understood that the invention may be embodied otherwise without departing from such principles.

What is claimed is:

1. A hand-held power tool comprising:
a drive motor;
a clutch connected to the drive motor, wherein the drive motor drives a tool member through the clutch;
the clutch comprising a clutch drum and the clutch drum comprising a circumferential wall provided with an end face, wherein the clutch is a centrifugal clutch comprising at least one flyweight, wherein the at least one flyweight in an engaged state of the clutch is resting on an inner side of the circumferential wall;
a follower member engaging a groove provided in the circumferential wall of the clutch drum, the groove extending from the end face of the circumferential wall into the circumferential wall and comprising a groove bottom and two groove sides positioned opposite each other;

a driven element that is connected to the follower member to be driven by the follower member;

wherein the circumferential wall comprises a protrusion located at the groove bottom, wherein the protrusion has a protrusion thickness measured at the groove bottom that amounts to at least approximately 110% of a wall thickness of the circumferential wall measured at the two groove sides.

2. The power tool according to claim 1, wherein the protrusion has a protrusion width measured parallel to an axis of rotation of the clutch and the protrusion width amounts to from approximately 0.8 mm to approximately 2.0 mm.

3. The power tool according to claim 1, wherein the protrusion has a protrusion length measured in a circumferential direction of the clutch drum and the protrusion length amounts to from approximately 50% to approximately 200% of a groove width of the groove.

4. The power tool according to claim 1, wherein the circumferential wall has an inner side and the inner side comprises a raised portion in an area next to the groove bottom, wherein the raised portion is raised relative to an area of the inner side next to the two groove sides.

5. The power tool according to claim 4, wherein a rise of the raised portion amounts to from approximately 0.05 mm to approximately 0.3 mm.

6. The power tool according to claim 1, wherein the circumferential wall has an outer side and the outer side comprises a raised portion in an area next to the groove bottom, wherein the raised portion is raised relative to an area of the inner side next to the two groove sides.

7. The power tool according to claim 6, wherein a rise of the raised portion amounts to from approximately 0.05 mm to approximately 0.3 mm.

8. The power tool according to claim 1, wherein the circumferential wall in the area next to the groove sides has no protrusion.

9. The power tool according to claim 1, wherein the groove sides comprise an area adjoining the end face and are positioned in the area adjoining the end face at an angle relative to each other that opens toward the end face.

10. The power tool according to claim 9, wherein the angle is at least approximately 10°.

11. The power tool according to claim 1, wherein the groove sides are mirror-symmetrical to each other.

12. The power tool according to claim 1, wherein the driven element is a pump.

13. A hand-held power tool comprising:
a drive motor;
a clutch connected to the drive motor, wherein the drive motor drives a tool member through the clutch;
the clutch comprising a clutch drum and the clutch drum comprising a circumferential wall provided with an end face;
a follower member engaging a groove provided in the circumferential wall of the clutch drum, the groove extending from the end face of the circumferential wall into the circumferential wall and comprising a groove bottom and two groove sides positioned opposite each other;
a driven element that is connected to the follower member to be driven by the follower member;
wherein the circumferential wall comprises a protrusion located at the groove bottom, wherein the protrusion has a protrusion thickness measured at the groove bottom that amounts to at least approximately 110% of a wall thickness of the circumferential wall measured at the two groove sides;
a brake device comprising a brake belt, wherein the brake belt interacts for braking with an outer side of the circumferential wall.

14. A method for producing a groove in a circumferential wall of a clutch drum of a clutch of a hand-held power tool, the hand-held power tool comprising: a drive motor; a clutch connected to the drive motor, wherein the drive motor drives a tool member through the clutch and the clutch comprises a clutch drum and the clutch drum comprises a circumferential wall provided with an end face; a follower member engaging a groove provided in the circumferential wall of the clutch drum, wherein the groove extends from the end face of the circumferential wall into the circumferential wall and comprises a groove bottom and two groove sides positioned opposite each other; a driven element that is connected to the follower member to be driven by the follower member; wherein the circumferential wall comprises a protrusion located at the groove bottom, wherein the protrusion has a protrusion thickness measured at the groove bottom that amounts to at least approximately 110% of a wall thickness of the circumferential wall measured at the two groove sides; the method comprising:
die cutting a groove with a die-cut groove depth that amounts to approximately 75% up to approximately 95% of a nominal groove depth of the groove and with a die-cut groove width that amounts to approximately 50% up to approximately 110% of a nominal groove width of the groove; and
subsequently plastically deforming a groove bottom of the die-cut groove until the nominal groove depth is reached.

15. The method according to claim 14, wherein the die-cut groove depth of the die-cut groove is at most 2.0 mm smaller than the nominal groove depth.

* * * * *